United States Patent [19]

Baumbach

[11] 4,331,839
[45] May 25, 1982

[54] TELEPHONE DISTRIBUTION FRAME CONNECTOR ASSEMBLY

[75] Inventor: Bertram W. Baumbach, Arlington Heights, Ill.

[73] Assignee: Reliable Electric Company, Franklin Park, Ill.

[21] Appl. No.: 215,742

[22] Filed: Dec. 12, 1980

[51] Int. Cl.³ ............................................. H04Q 1/14
[52] U.S. Cl. ..................... 179/98; 361/426; 361/415
[58] Field of Search ................ 179/98, 91 R, 91 A; 361/397, 399, 412, 413, 415, 426, 427, 429

[56] References Cited

U.S. PATENT DOCUMENTS

| | | | |
|---|---|---|---|
| 3,755,630 | 8/1973 | Boyer | 179/98 |
| 4,017,768 | 4/1977 | Valfre | 361/415 |
| 4,017,770 | 4/1977 | Valfre | 361/399 |
| 4,087,648 | 5/1978 | Giacoppo | 179/98 |
| 4,242,721 | 12/1980 | Krolak et al. | 179/98 |
| 4,247,882 | 1/1981 | Prager et al. | 179/98 |

Primary Examiner—Gerald L. Brigance
Attorney, Agent, or Firm—Trexler, Bushnell & Wolters, Ltd.

[57] ABSTRACT

A telephone main distribution frame connector assembly in which internal hand wiring is eliminated comprises a field of terminals for terminating incoming telephone line pairs and another field for terminating inside plant equipment lines, a field of terminals for terminating incoming lines, and a plurality of spaced parallel printed circuit boards for providing connections between the two fields of terminals. A series of spaced parallel ground busses run perpendicular to the circuit boards. The circuit boards have edge regions that are straddled by line terminal pins of overvoltage arresters for protecting the lines, which arresters also have ground terminal pins that engage the grounds busses between the circuit boards. Bezels at the first mentioned fields and an adjacent test field, along with bezels at the edge regions, aid in supporting the circuit boards.

17 Claims, 15 Drawing Figures

FIG. 3
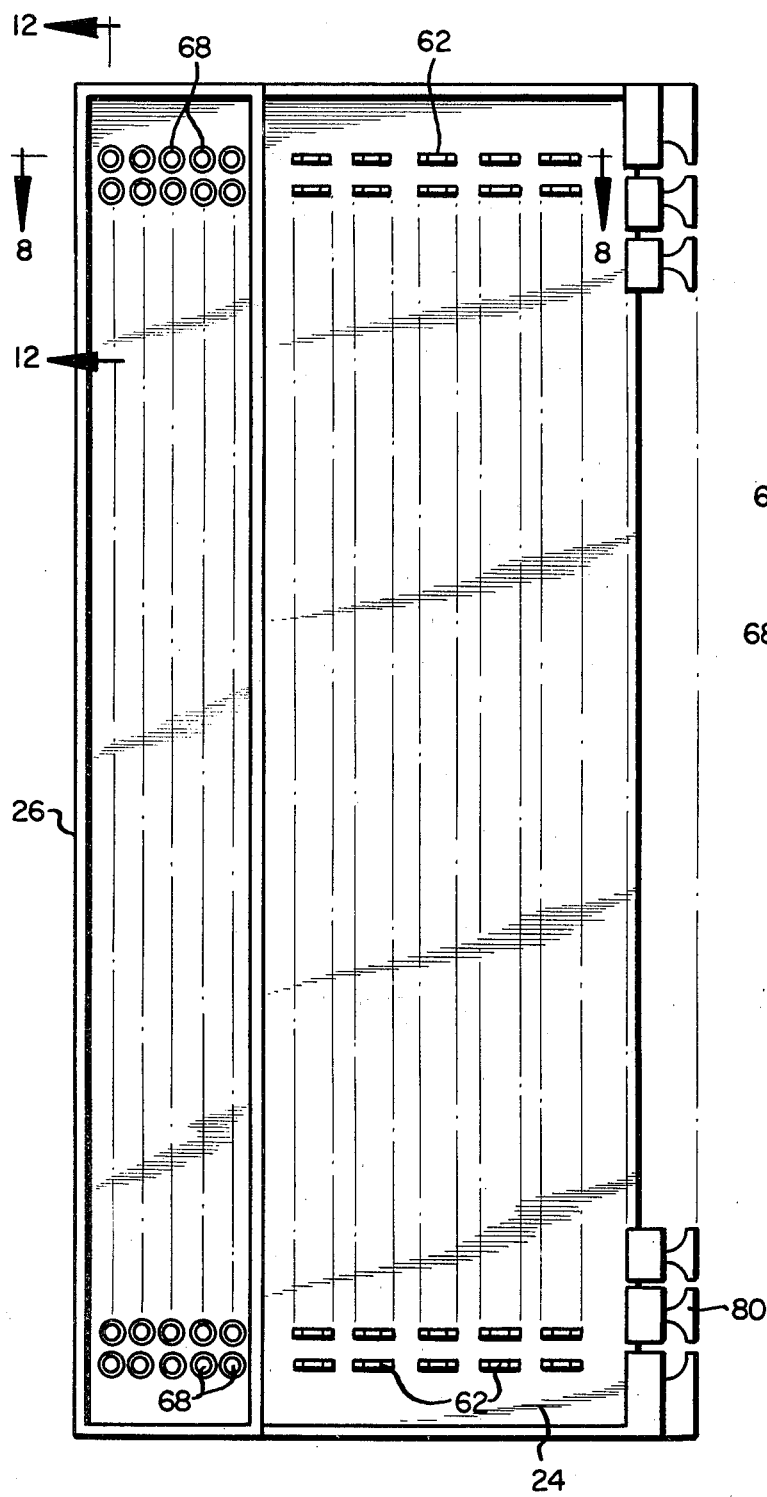
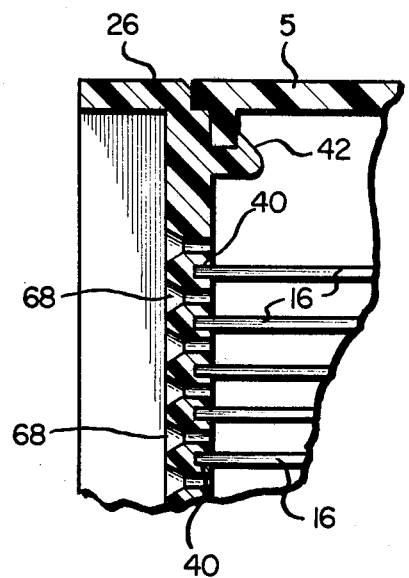
FIG. 12

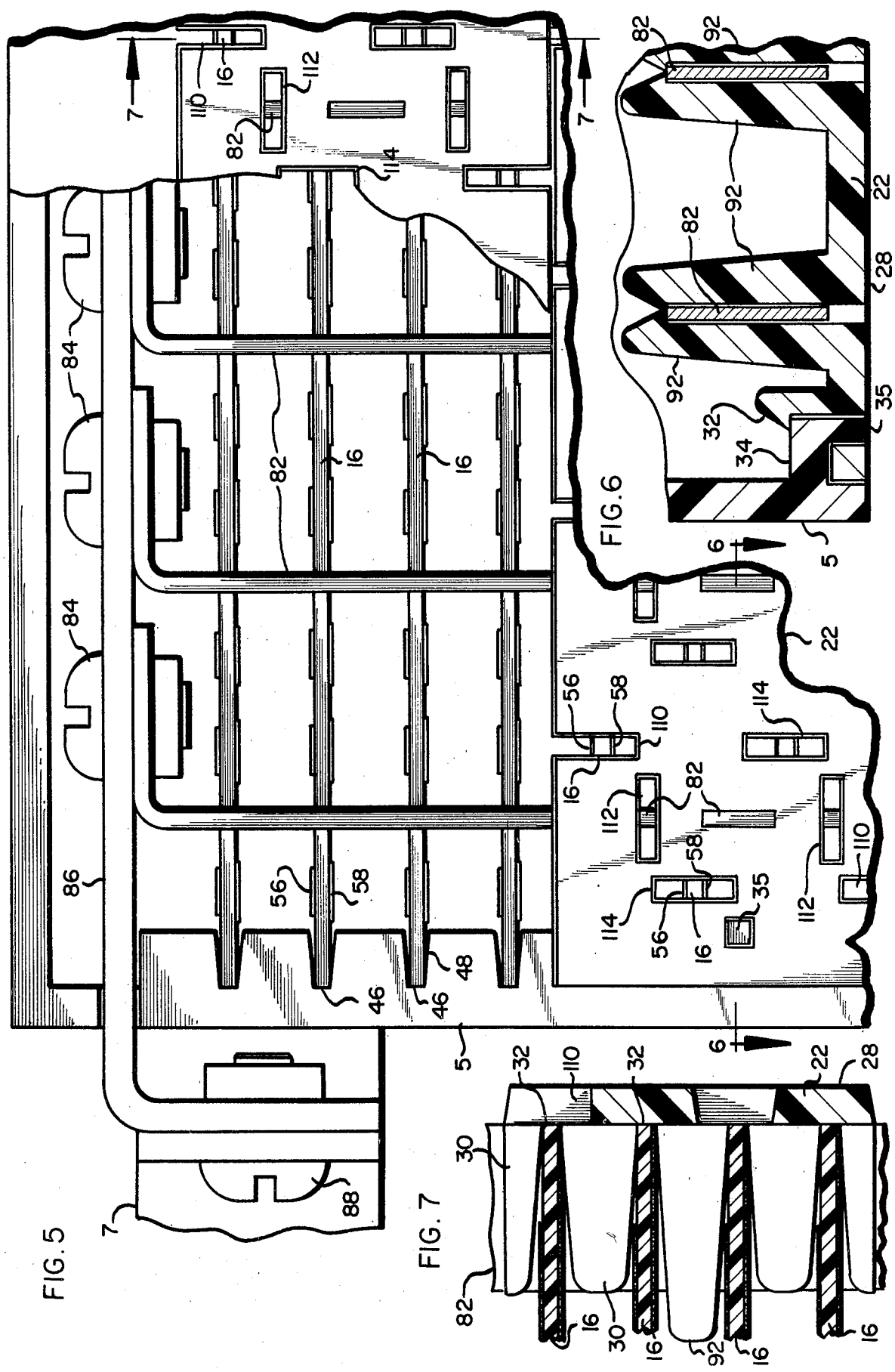

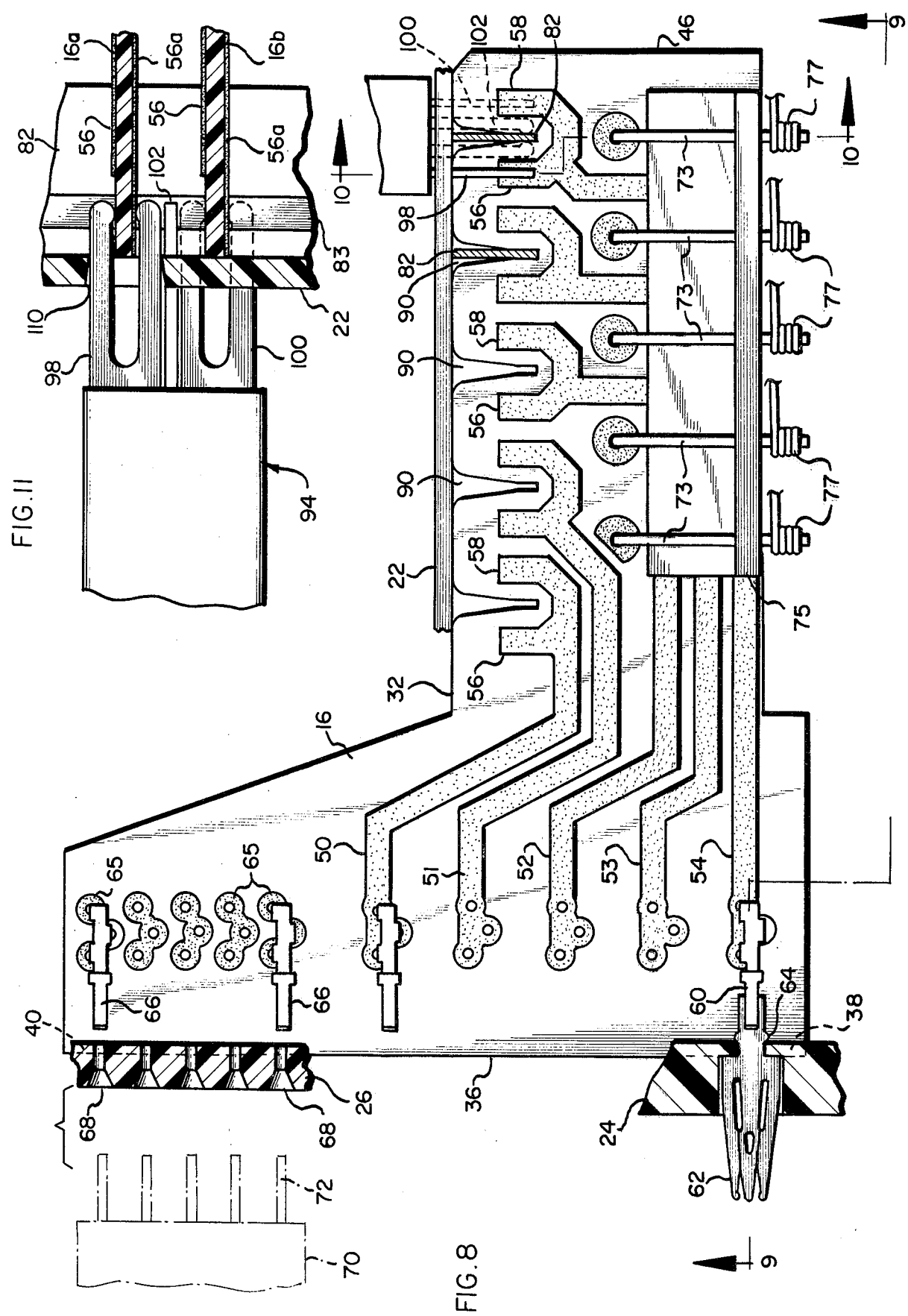

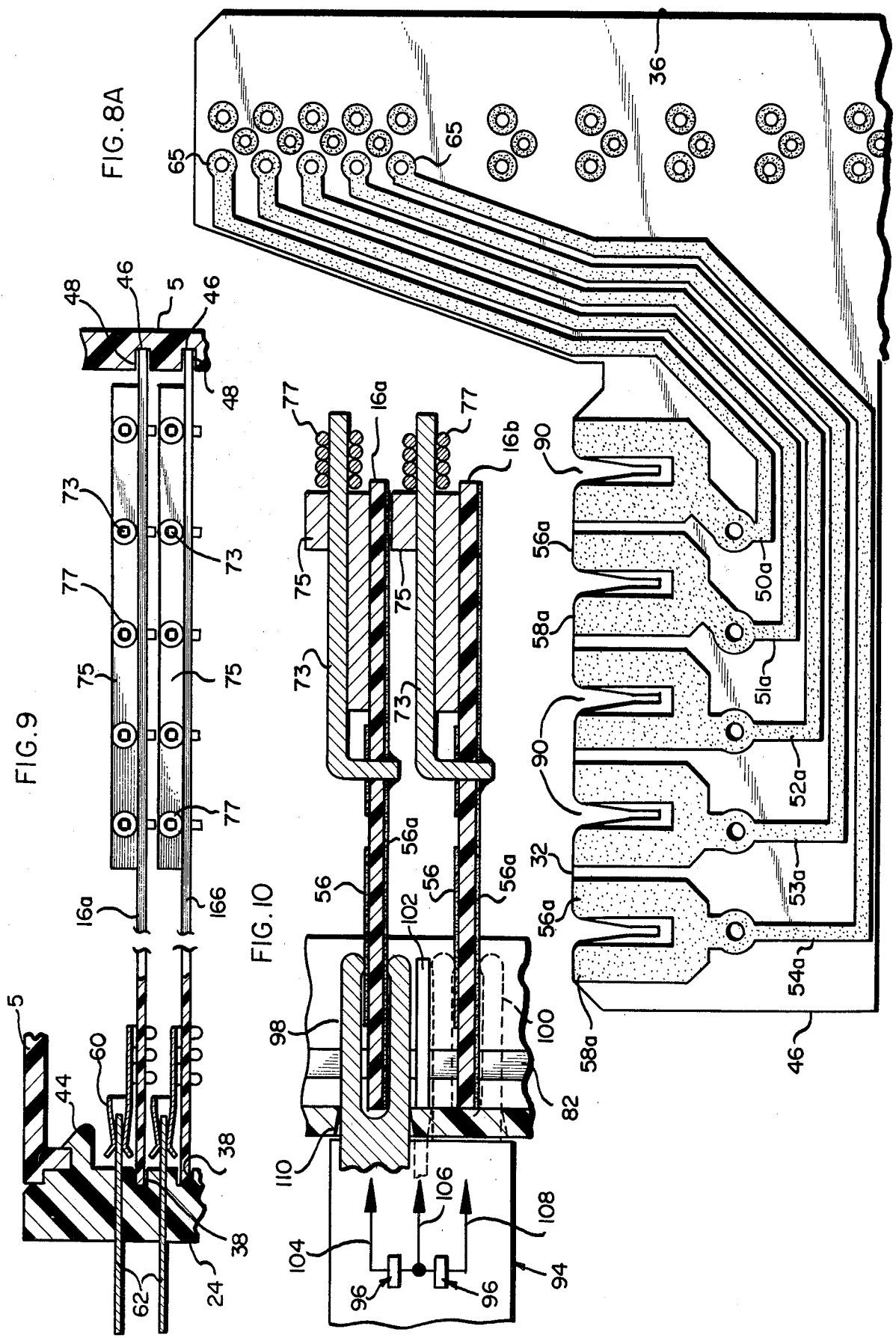

FIG. 13
FIG. 14
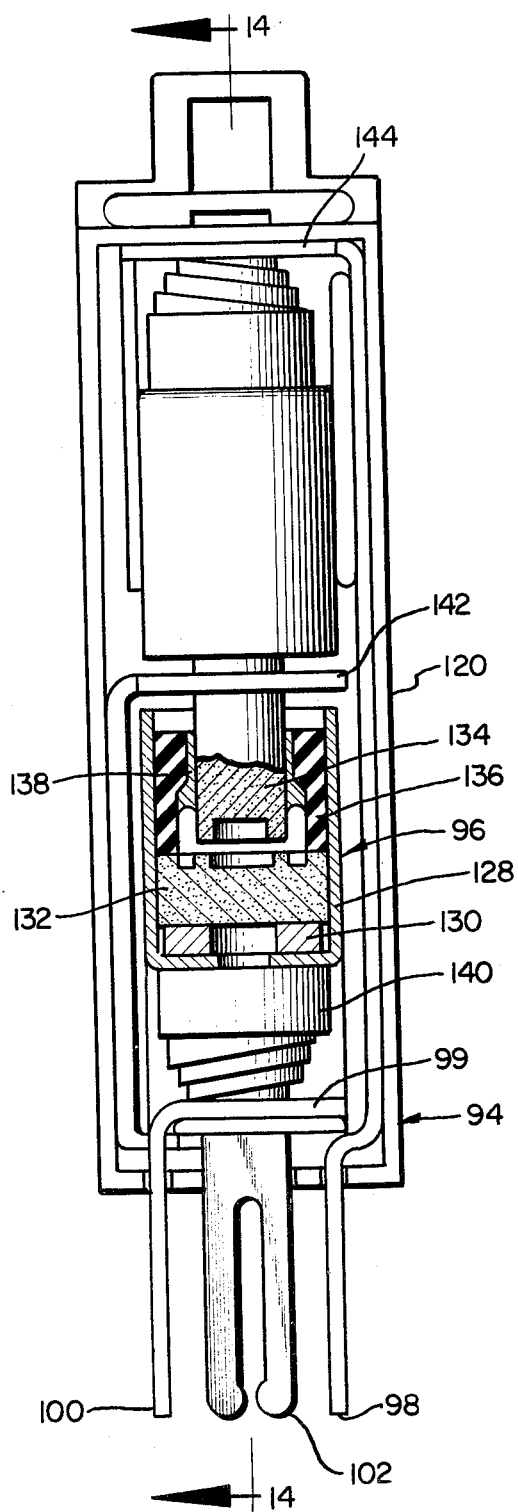
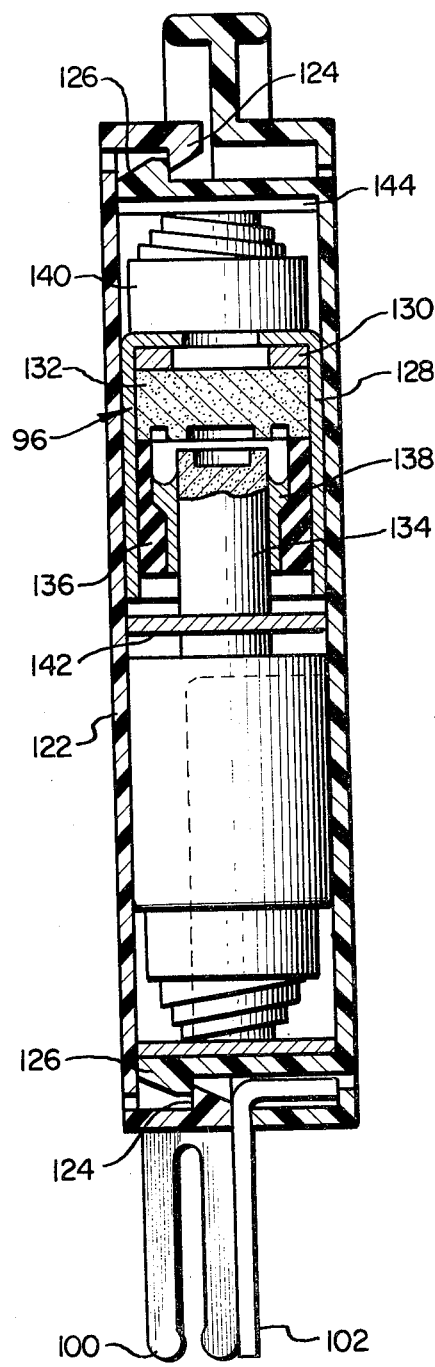

TELEPHONE DISTRIBUTION FRAME CONNECTOR ASSEMBLY

BACKGROUND OF THE INVENTION

This invention relates to telephone circuit distribution systems, and more particularly to a telephone distribution frame connector assembly having overload protector modules that provide line protection for the inside plant equipment such as central office switching equipment.

Telephone distribution frame connectors or panels as they are sometimes called of the type having plug-in modules are generally known in telephone art. In such connectors outside lines are connected to in plant or central office switching equipment through protector modules which protect the inside equipment from damage due to overvoltage faults. These connectors or panels are mounted on distribution frames which are generally positioned closely together. Space is at a premium and for that reason down-sizing of the connector is a continuing objective.

In a typical main distribution frame equipped with overvoltage protector modules and a test field, the incoming lines are terminated either directly or through a cable stub to a field of wire wrap or other type of terminals. Likewise, conductors from the inside plant equipment are terminated at another field of terminals. Between these two fields and connected to the lines are protector modules containing surge voltage arresters which serve to provide a surge path to ground for the respective lines when an overvoltage appears thereon. In addition, a test field is formed by a series of terminals which are respectively connected to the lines. Thus, the connector serves to provide a protected interface between the incoming lines and inside plant lines as well as providing a convenient place to test the various lines.

In typical arrangements of the foregoing type, wire conductors are routed between the various fields or groups of terminals in order to provide for the proper circuitry. These wire conductors maybe either wrapped or soldered or otherwise joined to the respective terminals, and they are generally routed behind the face of the connector at which the modules are plugged in. Thus, the wire conductors are sometimes referred to as "back plane" wiring, which really is simply the wiring that is internal to the connector. Such wiring is essentially a hand operation with the aid of wire wrapping tools, soldering equipment or other special tools intended to attach wires to terminals.

OBJECTS AND SUMMARY OF THE INVENTION

An object of this invention is to provide a telephone distrubtion frame connector assembly for the general purpose previously stated in which the so called back plane wiring is eliminated, thereby reducing the time and cost required to construct the connector assembly.

A further object of this invention is to provide relatively fool-proof termination within the connector or panel assembly so as to eliminate or reduce the possibility of field problems due to wiring errors made at the factory.

A still further object of this invention is to eliminate time consuming, point-to-point, wire testing in production as is presently done with conventional connector assemblies.

Another object of this invention is to provide a particularly large ground buss arrangement that is common to each protector module without sacrificing space.

A still further object of this invention is to provide for removability of wire connector clips which may be damaged without the necessity of removing and reattaching internal or back plane wiring. In this invention the clip terminal is simply pulled from the front of an associated bezel and another clip terminal pushed into place.

Another object of this invention is to reduce the amount of plastic from that which is generally required in a conventional connector having typical terminals used to interface with "plug-in" type protector modules. The present invention does not utilize such typical terminals; therefore only a thin bezel is required to provide the necessary strength for providing some support for the modules.

Yet another object of this invention is to provide a non-polarizing receptacle for the protector module so that it may be readily inserted in either of two positions of orientation instead of one, as is commonly provided.

In accordance with the foregoing objects the invention provides for a connector assembly that utilizes a plurality of printed circuit boards which may be easily replaced and by which back plane or like hand internal wiring is eliminated.

Broadly speaking, the invention comprises a telephone distribution frame connector assembly for connecting incoming lines to inside equipment comprising a housing, means for mounting said housing on a telephone distribution frame, a plurality of circuit boards each having printed circuit wiring thereon; each circuit board wiring having a first termination region for terminating incoming telephone line pairs, a second termination region for terminating inside equipment pairs, and a third termination region; cooperating means on said housing and on said circuit boards for removably mounting said circuit boards on said housing to form a first field comrised of a plurality of said first regions, a second field comprised of a plurality of said second regions, and an array comprised of a plurality of said third regions; the printed circuit wiring on said boards being in circuits from the respective line pairs to the respective inside equipment pairs, grounding means proximate to said third field but electrically insulated from said printed circuit wiring, overvoltage protector means for each line pair that provides surge protection from each line to said grounding means, said overvoltage protector means including a plurality of modules at said array that each removably connects with said third regions and said grounding means, and a test field on said housing for the line pairs and having test terminals adapted for reception of a testing device.

Further in accordance with the invention the housing has first bezel means at the aforesaid first and second fields, and second bezel means at corresponding edges of the circuit boards. The first bezel means may be composed of a test field bezel and a connector clip bezel respectively. The second mentioned bezel means maybe a group of bezel members forming a module bezel means at corresponding edges of the circuit boards whereby the first and second bezel means provide guides that in part support the circuit boards.

The module bezel members also include projections with fingers that are used to orient and hold ground busses to the bezel members to enhance the strength of the module bezel members.

In a practical form of the invention one hundred line pairs are terminated, it being understood that each pair consists of a tip and a ring conductor or circuit. One hundred overvoltage protector modules are used, each module having two arrester units, one for the tip side and the other for the ring side. Preferably each five modules function in conjunction with two adjacent printed circuit boards. One of the circuit boards contains printed wiring for five tip circuits while the other board has printed wiring for five ring circuits. The modules have pins that "plug-into" the circuit boards by stradling edges of the circuit boards, and each module has a ground pin that engages a ground buss. A longitudinal groove in the ground buss provides a detent means that cooperates with the ground pin to locate the module in an alternate position.

BRIEF DESCRIPTION OF THE FIGURES

FIG. 3 is a front elevational view of the connector assembly, namely as viewed from the lower side of FIG. 1;

FIG. 5 is an enlarged fragmentary view of the upper broken away portion of FIG. 2, the protector modules being removed for purposes of clarity;

FIGS. 6 and 7 are fragmentary sectional views taken along lines 6—6 and 7—7 respectively of FIG. 5;

FIG. 8 is an enlarged fragmentary sectional view taken along line 8—8 of FIG. 3;

FIG. 8A is a plan view of one of the circuit boards forming part of the present invention as seen from the side thereof that is opposite to that shown in FIG. 8;

FIGS. 9 and 10 are fragmentary sectional views taken along lines 9—9 and 10—10 respectively of FIG. 8;

FIG. 11 (on the sheet with FIG. 8) is a fragmentary sectional view of a portion of FIG. 10 but showing the protector modules in the so-called "detent" position;

FIG. 12 (on the sheet with FIG. 3) is a fragmentary sectional view taken along line 12—12 of FIG. 3;

FIG. 13 is a partial sectional view of one of the protector modules with the side cover removed therefrom and;

FIG. 14 is a sectional view taken along line 14—14 of FIG. 13 but with the cover shown mounted in place.

Figure 1:
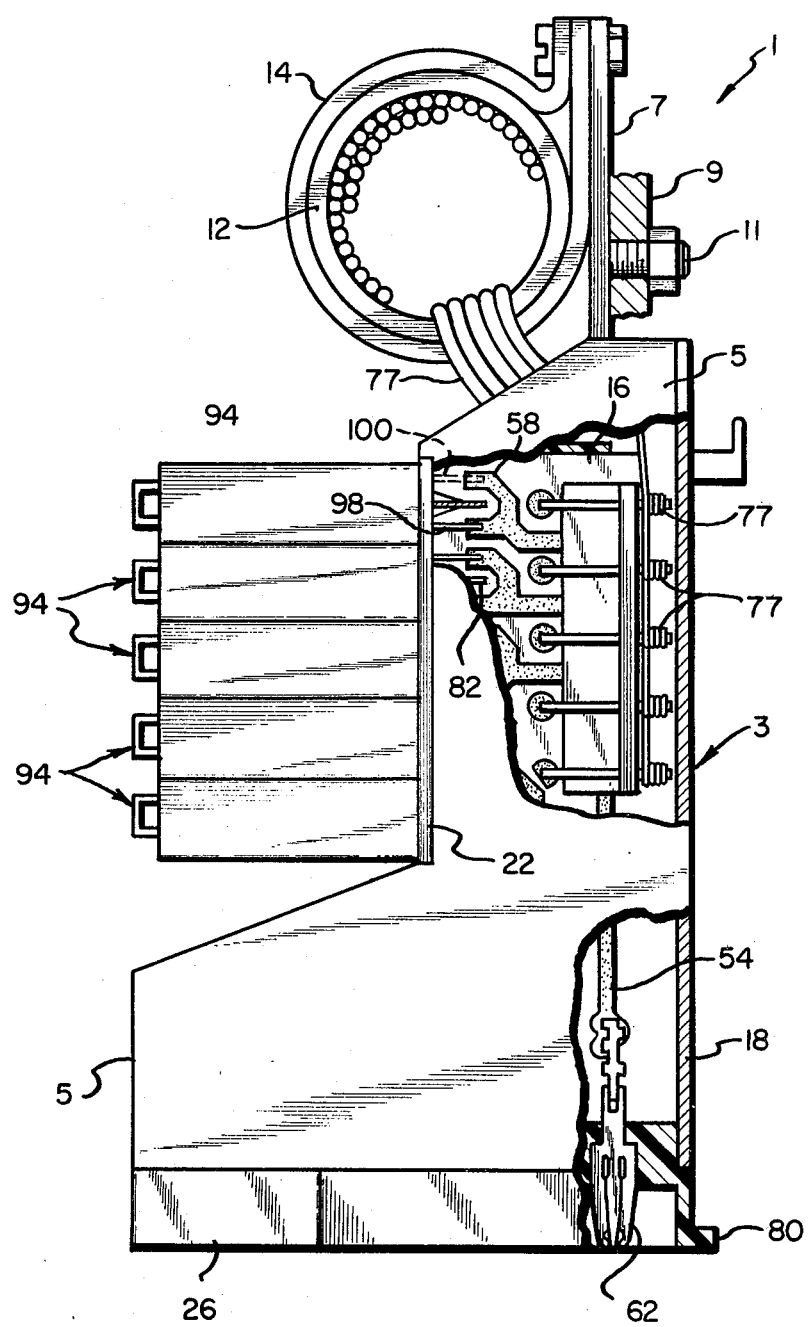
FIG. 1 is a top plan view, partially broken away and partially in section, of a connector assembly constructed in accordance with and embodying the present invention.

In various figures of the drawing numerous and duplicated parts are either omitted or are represented schematically for purposes of clarity of illustration.

DETAILED DESCRIPTION

Referring now in more detail to the drawing there is shown a connector assembly 1 that comprises a frame or housing 3 which supports or contains the bulk of the components of the assembly, to be hereinafter more fully described. The housing 3 includes a housing section 5 of rigid plastic material. This housing section 5 is secured by screws 6 to a metallic mounting bracket 7. The mounting bracket 7 is, in turn, secured to a telephone main distribution frame 9 by upper and lower bolt and nut assemblies 11. In the form of the invention shown there is a cable stub 12 which is secured by cable clamp 14 to the mounting bracket 7 so that the cable stub 12 is adjacent to housing 3. Typically, the cable stub 12 contains one hundred pairs of incoming lines which are to be terminated. Where a cable stub is not provided the incoming cable may itself be clamped onto the mounting bracket 7.

Disposed within the housing 3 is a series of like printed circuit broads 16 each having printed circuit wiring on its opposite sides. In the form of the invention disclosed, there are forty such printed circuit boards 16. These printed circuit boards serve to provide an interconnection or interface between the incoming line pairs from the cable stub 12 and the line pairs that run to the inside building or central office equipment. As will be later described, edge portions of the circuit boards also provide for connections with overvoltage protector modules whereby the internal or back plane wiring usually found in main distribution frame connectors is eliminated.

Figure 4:
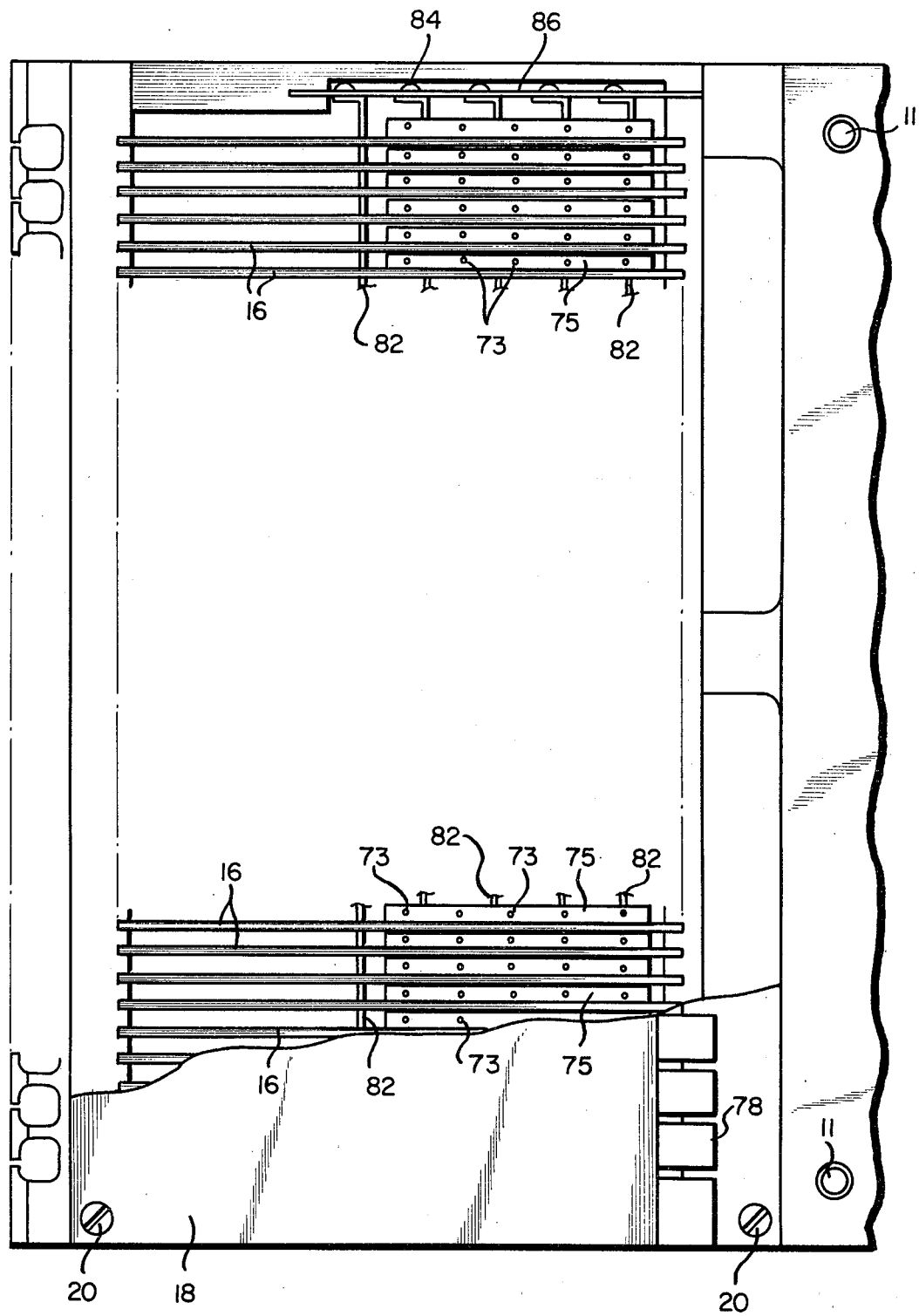
FIG. 4 is a fragmentary elevational view, partially broken away, of the connector assembly as seen from the right-hand side of FIG. 1.

In addition to the housing section 5 the housing 3 includes a cover plate 18 removably held in place by screws 20 (FIG. 4). Also forming part of the housing 3 are a number of bezels which cooperate with the housing section 5 to provide guides or tracks for supporting the printed circuit boards 16 in parallel relationship. Thus, there is provided a number of module bezels 22, there being ten such bezels utilized in the present embodiment of the invention. As best seen in FIGS. 5-8, each module bezel 22 has a wall 28 together with rearwardly extending fingers 30. As shown in FIG. 7, the fingers 30 form guides for retaining and supporting an edge 32 of each of the printed circuit boards 16. Each of the module bezels 22 is a one piece plastic member having at opposite ends of the bezel locking nibs 32, one such nib 32 at one end being shown in FIG. 6. Each nib 32 is sufficiently resilient to form an interlock with flanges 34,34 (FIGS. 2, 5, and 6) on the housing section 5. The flanges 34 have vertically spaced pins 35 that project through the bezels 22 and serve to locate vertically the bezels 22 in proper alignment for reception of the edges 32.

The connector clip bezel 24 is also a plastic member that aides in supporting another edge 36 of the printed circuit board 16, as best seen in FIGS. 8 and 9. This edge 36 is spaced from but perpendicular to the edge 32. Accordingly, the bezel 24 is formed with a series of spaced parallel horizontal slots 38 which receive the edges 36 of the respective printed circuit boards 16. The test field bezel 26 also contains slots 40 (FIG. 12) that are in respective alignment with the slots 38 so that one slot 40 is a continuation of a slot 32, it being noted that the connector clip bezel 24 and the test field bezel 26 are in side-by-side relationship at the front face of the connector assembly. As seen in FIG. 9 each circuit board also has an edge 46 parallel and opposite to edge 36. Edges 46 are supported in horizontal guides 48 in the housing section 5.

The test field bezel 26 and the clip bezel 24 have locking nibs 42, 42 respectively, as best seen in FIGS. 9 and 12. These nibs 42,44 are resilient and snap into locking relationship with the housing section 5. FIGS. 9 and 12 show the locking nib arrangement at the upper ends of the bezels 24 and 26. However, a like locking arrangement is provided at the lower ends of the two bezels 24, 26.

As shown in FIGS. 8-11 the circuit board 16 is a flat member which is roughly "L" shaped and has printed circuit wiring on both sides thereof. Five lines or circuits are carried by each board 16; hence two boards 16 will carry the ten lines required for five pairs. Typically, for example, the circuit board 16a in FIGS. 9-11 may be considered as the tip board whereas the adjacent board 16b may be considered as the ring board. Five modules, as will hereinafter be described, are utilized with each pair of boards 16a, 16b. On one side of the circuit board are printed circuit conductors 50, 51, 52, 53 and 54 that each terminate at one end in respective bifurcated sections 56, 58. These sections 56, 58 are adjacent to but spaced from the edge 32. The other ends of the conductors 50-54 terminate adjacent to the edge 36 and are adapted to hold bifurcated contacts 60 which are soldered in place. Each of the contacts 60 removably receives a flat connector clip 62 that projects through the bezel 24 such that the tail of the clip 62 is held by the spring action of the tines of the contact 60. The clip 62 may be of any known type, for example a clip having three cantilever beams or legs that receive insulated conductors therebetween and strip the insulation therefrom as the conductors are installed on the clip 62. Clips of this type are known in the art and are, therefore, not described in detail herein. Suffice it to say that, as best seen in FIG. 3, the clips 62 form a field for the termiation of line pairs from the inside plant equipment. Furthermore, each clip 62 may be removed from its associated contact 60 by simply pulling the clip away from the contact 60, the bezel 24 yielding sufficiently to allow the slightly widened section 64 (FIG. 8) to pass through the bezel opening.

On the opposite face of the circuit board, as shown in FIG. 8A, there are circuit conductors 50a-54a inclusive that run from the edge 32 to terminal portions 65 (see also FIG. 8) at which there are contacts 66 soldered in place. The contacts 66 are, however, on the side of the circuit board containing the printed circuit wiring 50-54. The five contacts 66 are grouped together and are laterally off-set from the group of connector clips 62 and their associated contacts 60. The contacts 66 are in alignment respectively with openings 68 in the test field bezel 26 so as to form a forwardly presented test field shown in FIG. 3. The test field is adapted to recieve a test shoe or like device 70 having test shoe pins 72 adapted to fit into the test field contacts 66 in a manner known in the art. Again referring to the circuit board side shown in FIG. 8A, it will be noted that the printed circuit conductors 50a-54a inclusive terminate in bifurcated ends 56a, 58a which extend up to the circuit board edge 32 whereby a single form of circuit board may be used for each of the forty boards.

Each printed circuit board printed conductor also has a pin 73 soldered thereto, there being five such pins for each circuit board. These pins 73 are parallel and are bent to project away from the circuit board edge 32. The pins are supported by an insulator 75 on the circuit board and through which the pins 73 project. The pins 73 from all of the circuit boards provide a field at which line pairs from the cable stub 12 are attached. For purposes of illustration five conductors 77 are shown wire wrapped respectively around the pins 73, and there will be five additional conductors wrapped around the corresponding pins of an adjacent printed circuit board to provide the ten conductors making up the five line pairs for each two circuit boards 16a, 16b. Consequently, for each line circuit, whether tip or ring, there is a continuous conductive path from each pin 73 through the printed circuit wiring and to an associated connector clip 62. Likewise, there is a test connection connected with each of the conductors on each printed circuit board. For clarity of illustration, not all of the conductors from the cable stub are shown. In any event, however, the cover plate 18, which covers the wrap pins 73, may have a fanning strip 78 (FIG. 4) along one edge thereof. The connector clip bezel 24 may also have a fanning strip 80 (FIG. 3) along one edge thereof. Both fanning strips 78, 80 may be used to accommodate conductors leading to the inside equipment.

Figure 2:
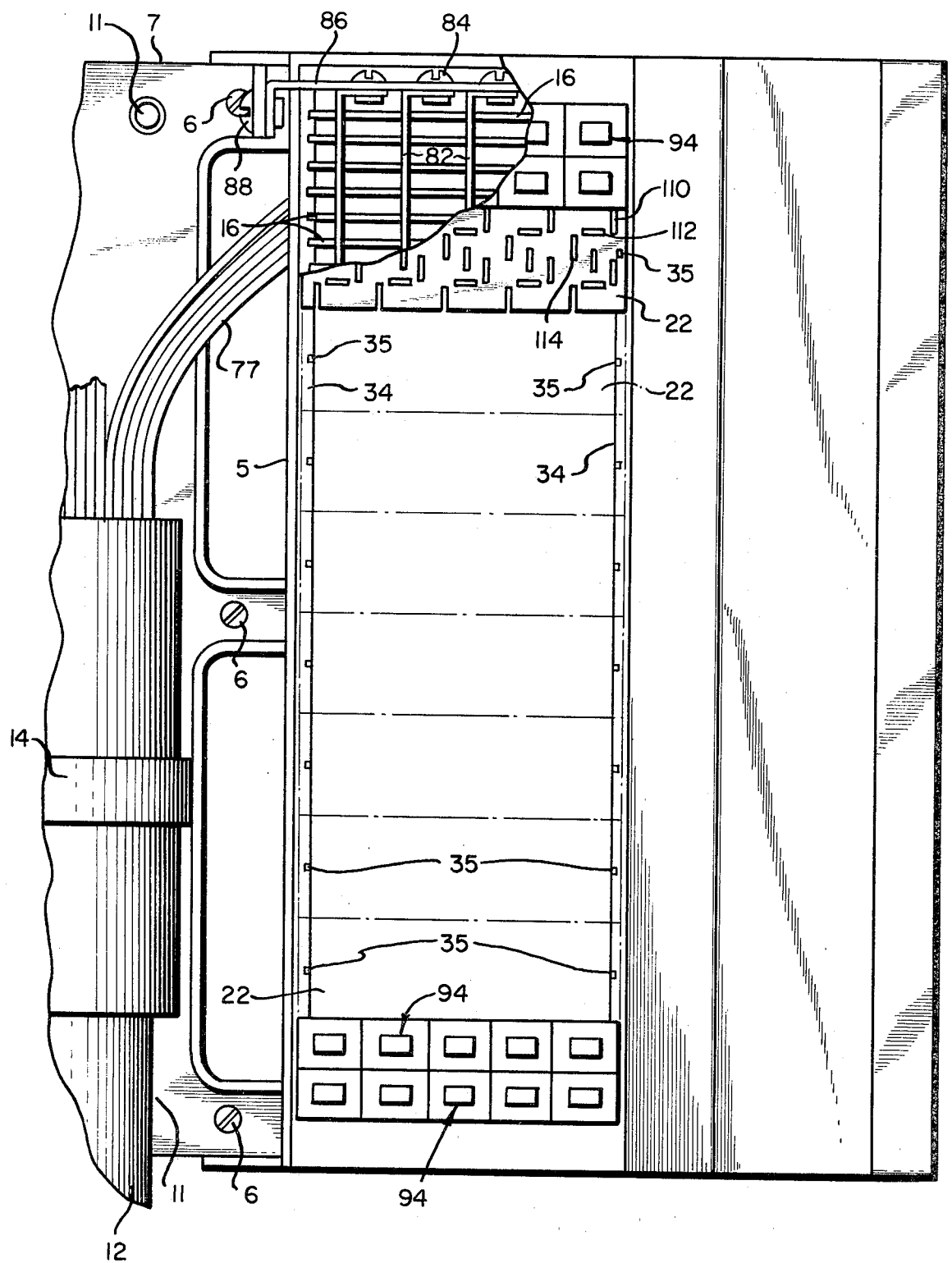
FIG. 2 is a fragmentary elevational view, partially broken away, as seen from the left-hand side of FIG. 1.

Forming part of the present invention is a grounding arrangement through which each line may be grounded in the event of a surge condition on that line. For this purpose the assembly 1 is provided with a series of vertical metallic ground busses 82 which are parallel to each other and which run perpendicular to the printed circuit boards 16, as best seen in FIGS. 2 and 5. The upper ends of the vertical grounding busses 82 are secured by screw and nut assemblies 84 to a metallic horizontal ground buss 86. This buss 86 is, in turn, secured by bolt and nut assembly 88 to the metallic mounting bracket 7. The final connection to ground may be through the main frame or otherwise in a manner known in the art.

For purposes of accommodating the vertical busses 82 the printed circuit boards are formed with parallel slots 90 between each of the bifurcated ends 56, 58 as shown for example in FIG. 8 wherein two of such busses 82 are illustrated. Each of the slots 90 opens at the edge 32 and will accommodate one buss 82 in close proximity to the edge 32, and the busses 82 are of such length as to traverse all of the circuit boards. Furthermore, the busses provide a support for each of the modules bezels 22. As seen in FIGS. 6 and 7 each bezel 22 has fingers 92, 92 which serve the same function as do the fingers 30 in supporting a circuit board edge. However, the fingers 92, 92 will spread apart and then snap back together when assembled with the ground busses 82 such that the ground busses 82 remain between the fingers 92, 92 in the assembly 1.

The connector assembly 1 also includes protector modules 94 that provide surge voltage protection for each tip and ring line to ground. Each two adjacent circuit boards operates in conjunction with five modules 94 so that in the form of the invention illustrated there are one hundred modules 94. Notwithstanding that of the two adjacent circuit boards one will carry the tip conductors while the other carries the ring conductors, each module provides surge voltage arresters for one line pair.

Accordingly, each module contains two surge voltage arresters 96, 96 schematically indicated in FIG. 10 and structurally shown in FIGS. 13 and 14. These surge voltage arresters 96, one for each of tip and ring, maybe of any suitable type that will ground the line under surge conditions. The module 94 includes line pins 98, 100 and a ground pin 102. The several pins 98, 100, 102 are bifurcated flat members that project from one end of the modulee housing. The line pins 98, 100 are sized and positioned to straddle the edges of the circuit boards 16 as best shown in FIGS. 10 and 11 whereby the rounded tip portions of the line pins 98, 100 engage the printed circuit wiring on opposite sides of the circuit board when the module is in its normal operative position shown in FIG. 10. The ground pin 102 is sized to straddle and grip the opposite sides of the proximate vertical buss 82 in the space between adjacent circuit boards. In FIG. 10 conductor 104 represents a conductive connection from one side of one of the surge voltage arresters 96 up to the line pin 98 while conductor 108 represents a conductive connection from one side of the other surge voltage arrester to the line pin 100. Conductor 106 represents a conductive connection between the opposite side of each of the two surge voltage arresters to ground.

The two lines pins 98, 100 are parallel to each other but are off-set while the ground pin 102 runs perpendicular to the line pins and generally between them. The module bezels 22 have holes 110,112,114 disposed in a pattern that is identical to the pattern of the modules pins 98, 100,102, hole 112 being for ground pin 100. This pattern is best shown in FIG. 2 and in FIG. 5 wherein it is seen that the holes 110, 114 run lengthwise perpendicular to adjacent circuit boards 16,16 respectively, while the hole 112 runs perpendicular to the ground buss 82 that is between the holes 110,114. It will be apparent that the pattern is a symmetrical one enabling the module to be installed in either of two positions one hundred eighty degrees apart. When installed, one of the line pins 98 will engage regions 56 and 56a on one board, for example, while the other line pin 100 will engage regions 58,58a on the adjacent circuit board. The holes 110,114 serve to guide the line pins 98,100 into respective engagement with the edge portions 56,58,56a,58a of the circuit boards 16 (see 16a and 16b—FIG. 11) and to guide the ground pin 102 into contact with the associated ground buss 82. Moreover, in the form of the invention shown each module bezel unit 22 accommodates ten modules 94 by having ten groups of holes 110,112,114.

Turning now to FIGS. 10 and 11, when a module is in its normal position on the assembly, as shown in FIG. 10, the "tip in" conductor 56 on circuit board 16a is electrically connected by module pin 98 to the "tip out" conductor 56a on circuit board 16a. Since the conductor 56a is electrically connected to the pin 73 on the circuit board 16a, the insulating gap between the conductor 56 and the circuit board edge 32 has been bridged to allow the circuit to be completed to conductor 54 and through to the associated clip 62. Likewise, as to the circuit board 16b the "ring-in" conductor 56 is connected to the "ring-out" conductor 56a by the line pin 100 so that a circuit is formed from the pin 73 on circuit board 16b through to a conductor on the circuit board 16b that is electrically connected to the associated connector clip 62.

In FIG. 11 the module 94 is in the so-called "detent" or partially withdrawn position to the extent that the line pins 98, 100 no longer engage the conductor portions 56 but nevertheless remain in contact with the conductor portions 56a. Ground pin 102 now engages groove 83 in the ground buss 82 to provide a positive detent position. The incoming lines will remain protected although not connected to inside plant equipment.

From the foregoing it will be seen that each circuit board has a first termination region made up of the wire wrapped pins 73 and with the wire wrapped pins of all the circuit boards making up a first termination field. There is additionally provided for each circuit board a second termination region comprised of connector clips 62 and with all the connector clips of all the boards constituting a second field and at which wires from inside plant equipment may be terminated.

There is additionally provided a third termination region for each circuit board at the edge 32 thereof and at which the modules are "plugged-in" to the circuit board. Thus, the edge regions 32 of all the boards 16 make up an array of terminals that contact the modules. Finally, there is provided a test field made up of the total of the test terminals 66 and which is adjacent to the field of connector clips 62.

As previously pointed out, the surge voltage arresters 96 may be of any suitable type such as a carbon, two or three element gas tube, or other spark-gap type. Varistor or other semi-conductor types of arresters may, in theory at least, be designed to be incorporated into the modules 94 while retaining substantially the module pin configuration herein shown. However, FIGS. 13 and 14 show one type of overvoltage arrester unit 96 considered suitable for the present invention.

In FIG. 13 the module 94 is made up a rectilinear plastic housing 120 that includes a side cover 122 with opposed ends 124,124 which are shaped to snap lock with lips 126, 126 on the remaining part of the housing. The arrester units 96,96 are of like construction and are in coaxial back-to-back relationship within the housing. Each arrester includes a metallic cup 128 that receives a solder ring 130 against the cup end wall. Also within the cup 128 is a carbon disc electrode 132 that cooperates with another carbon electrode 134 of rod-like form. The rod electrode 134 is bonded to a tubular insulator 136 by means of an adhesive 138. The rod electrode 134 is recessed within the insulator 136 so that when the disc electrode 132 engages the end of the insulator 136 a spark gap of predetermined width will be provided between the electrodes 132, 134.

For the arrester unit nearest the pins 98,100,102 there is a conductive connection with the flange 99 on line pin 100 to lower volute spring 140, thereby providing electrical continuity from the pin 100 to the electrode 132. The volute spring 140 presses the assemblage in the cup 128 away from the pins 98,100,102 such that an end of the electrode 134 contacts a flange 142 on the ground pin 102. Consequently, if a surge voltage appears on line pin 100 the surge will be grounded through a circuit across the spark gap between the electrodes 132, 134. If the surge is prolonged so as to heat the solder 130 to melting temperature, the cup 128 will be pushed by lower volute spring 140 into contact directly against the flange 142 and ground the line that is connected to the pin 100.

The surge voltage arrester 96 remote from the pins 100, 102 and shown in section in FIG. 14 operates in a like manner. The upper volute spring 140 in FIG. 14 is in contact with an end flange 144 on the line pin 98. Therefore, a conductive connection is established between the line pin 98 and the disc electrode 132 shown in FIG. 14. The upper volute spring 140 in FIG. 14 presses the carbon rod 134 toward the pins 100, 102 and against the ground pin flange 142. Consequently, a surge voltage on line pin 98 will be grounded by a circuit that includes the spark gap formed by the electrodes 132,134 in FIG. 14. Similarly, an overcurrent condition sufficient to melt the solder pellet 130 wil urge the cup 128 of FIG. 14 into engagement with the fange 142.

Removal and replacement of a circuit board 16 is relatively simple. The cover plate 18 may first be removed after which the wire wraps 77 are removed from the pins 73 of the affected circuit board. Whatever wires there are on the clips 62 that are joined to the affected circuit board are removed after which the clips 62 on that board are removed. With the modules removed from the affected board, the board is free to be withdrawn from the assembly in the direction away from the module bezels 22. The new circuit board is then installed in the reverse order. Moreover, despite the fact that in any one circuit board only one group of regions, i.e. either 56 and 56a or 58 and 58a is used, only one type of circuit board need be employed or used in the assembly either originally or as a replacement.

What is claimed is:

1. A telephone distribution frame connector assembly for connecting incoming lines to inside equipment, comprising a housing, means for mounting said housing on a telephone distribution frame, a plurality of circuit boards each having printed circuit wiring thereon; each circuit board wiring having a first termination region for terminating incoming telephone line pairs, a second termination region for terminating inside equipment pairs, and a third termination region; cooperating means on said housing and on said circuit boards for removably mounting said circuit boards on said housing to form a first field comprised of a plurality of said first regions, and second field comprised of a plurality of said second regions, and an array comprised of a plurality of said third regions; the printed circuit wiring on said boards being in circuits from the respective line pairs to the respective inside equipment pairs, grounding means proximate to said array but electrically insulated from said printed circuit wiring, overvoltage protection means for each line pair that provides surge protection from each line to said grounding means, said overvoltage protector means including a plurality of modules at said array that each removably connects with said third regions and said grounding means, and a test field on said housing for the line pairs and having test terminals adapted for reception of a testing device.

2. An assembly according to claim 1 in which said circuit boards are parallel.

3. An assembly according to claim 2 in which said circuit boards are in guides on said housing.

4. An assembly according to claim 3 in which said housing has first bezel means located at said second field, and second bezel means at corresponding edges of said circuit boards, said edges running transverse to said first bezel means, said first and second bezel means having guides that support said circuit boards.

5. An assembly according to claim 4 which includes wire connector clips individually removable from and replaceable in said second field by movement through said first bezel means.

6. An assembly according to claim 1 in which each said third termination region is at an edge of a circuit board and said modules have terminal pins that span said edges.

7. An assembly according to claim 1 including means by which said circuit boards may be individually removed from and replaced in the assembly.

8. A telephone distribution frame connector assembly for connecting incoming lines to inside equipment comprising a plurality of circuit boards having printed circuit wiring thereon; each circuit board wiring having a first termination region for terminating incoming telephone line pairs, a second termination region for terminating inside equipment pairs, and a third termination region, said third termination region being at parallel edges of said circuit boards, a first field comprised of said first regions, a second field comprised of said second regions and an array comprised of said third regions; the printed circuit wiring on said boards being in circuits from the respective line pairs to the respective inside equipment pairs, grounding means electrically insulated from said printed circuit wiring, and overvoltage protection means for each line pair to provide surge protection from each line to said grounding means, said overvoltage protector means including a plurality of modules at said array that removably connect with said third regions and said grounding means, each line pair being in a tip and ring circuit respectively, the tip circuits being at one edge of a circuit board and the ring circuits being at the edge of an adjacent circuit board.

9. An assembly according to claim 8 in which each module has pins in the tip and ring circuits respectively, the pins in the tip circuit straddling the edge of one circuit board and the pin in the ring circuit straddling the adjacent circuit board.

10. An assembly according to claim 8 in which each said module has a ground pin that engages said grounding means between the adjacent circuit boards.

11. A telephone distribution frame connector assembly comprising a plurality of circuit boards having printed circuit wiring thereon; said boards having means forming a first region for terminating incoming telephone lines, and means forming a second region for terminating inside equipment lines, said printed circuit wiring being in line circuits running between the incoming lines and the inside equipment, a series of ground busses, said circuit boards having a series of slots that receive said ground busses, and means for maintaining the circuit boards in predetermined relationship; said last-named means including a structure having means supporting corresponding edges of said circuit boards and also having openings for receiving terminals of overvoltage protector devices for said lines.

12. An assembly according to claim 11 in which said structure has means for receiving said ground busses.

13. An assembly according to claim 11 in which said circuit boards are parallel, said ground busses being perpendicular to said circuit boards, there are overvoltage protector modules having line pins that engage said circuit boards, and said modules have ground pins that engage said ground busses between the circuit boards.

14. An assembly according to claim 11 in which said structure is a bezel and in which at least one of said openings is in alignment with an edge of a circuit board and a further opening in alignment with a ground buss.

15. A telephone distribution frame connector assembly for connecting incoming telephone line pairs to inside equipment such as switching equipment comprising: first termination means for terminating incoming telephone line pairs, second termination means for terminating inside equipment pairs, printed circuit wiring extending between said first and secon termination means for electrically connecting terminated incoming line pairs to terminated inside equipment pairs respectively to provide continuous tip and ring circuits from the incoming line through to the inside equipment, a test field connected by said printed circuit wiring to each of said tip and ring circuits, grounding means insulated from said printed circuit wiring, the grounding means and the printed circuit wiring forming terminal regions, and overvoltage protector means connected to said terminal regions to form surge protection circuits from each tip and ring circuit to said grounding means in the event of a surge voltage condition on an associated line.

16. An assembly according to claim 15 in which said overvoltage protector means has at least one line terminal and a ground terminal, and said line terminal is in direct but removable engagement with said printed circuit wiring, said ground terminal being in direct but removable engagement with said gounding means.

17. An assembly according to claim 16 in which the grounding means comprises a buss bar that is adjacent to said printed circuit wiring.

* * * * *